Figure 1:
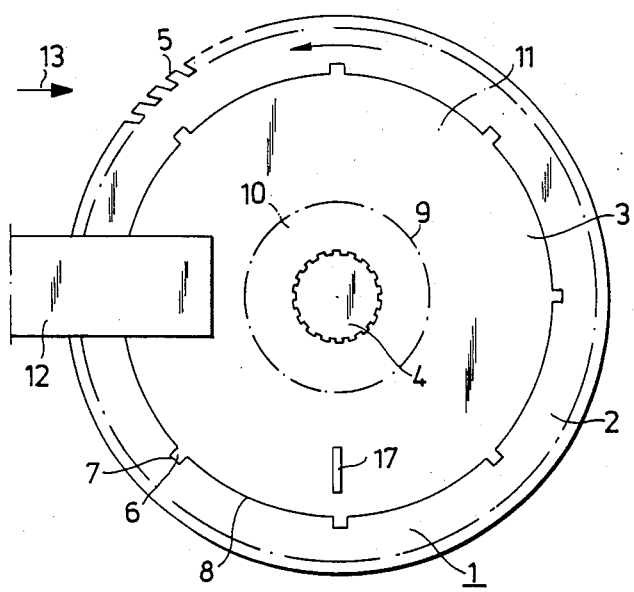

United States Patent [19]

Dutina

[11] Patent Number: 4,662,259

[45] Date of Patent: May 5, 1987

[54] ARRANGEMENT IN CIRCULAR SAWS, AND SAW-BLADES THEREFOR

[75] Inventor: Hans Dutina, Saltjö-Boo, Sweden

[73] Assignee: Hans Dutina, Research & Development AB, Saltjö-Boo, Sweden

[21] Appl. No.: 830,003

[22] Filed: Feb. 18, 1986

[30] Foreign Application Priority Data

Feb. 22, 1985 [SE] Sweden ............................ 8500892

[51] Int. Cl.⁴ ...................... B27B 33/12; B23D 61/02
[52] U.S. Cl. ...................................... 83/821; 83/835; 83/837; 83/838
[58] Field of Search .................. 83/835, 838, 837, 821

[56] References Cited

U.S. PATENT DOCUMENTS

| 220,008 | 9/1879 | Weaver | 83/838 |
| 411,189 | 9/1889 | Grey | 83/838 |
| 1,357,030 | 10/1920 | Currier | 83/838 |
| 4,026,177 | 5/1977 | Lokey | 83/835 |

FOREIGN PATENT DOCUMENTS 2977 of 1895 United Kingdom .................. 83/838

Primary Examiner—Donald R. Schran
Attorney, Agent, or Firm—Nies, Webner, Kurz & Bergert

[57] ABSTRACT

An arrangement in circular saws of the kind which incorporate at least one saw-blade (1), a saw-blade drive spindle or the like, and at least one guide means (12, 14, 15) active against the saw-blade.

The arrangement is particularly characterized in that there is provided at least one saw-blade assembly (1) which co-operates with a guide means (12, 14, 15) and which comprises at least two mutually separate, circumferentially extending blade-sections (2, 3), of which a peripherally located blade-section (2) provided with saw-teeth (5) is arranged for movement relative to the nearest inwardly located blade-section (3, 11) along an interface-zone (8) located between the two blade-sections (2, 3, 11), and is attached to the nearest inwardly located blade-section by means of parts which substantially prevent relative rotation between the two blade-sections in order to permit torque to be transmitted from the saw spindle (4) to the peripheral blade-section (2).

The invention also relates to a circular saw-blade assembly.

13 Claims, 3 Drawing Figures

U.S. Patent May 5, 1987 4,662,259

ARRANGEMENT IN CIRCULAR SAWS, AND SAW-BLADES THEREFOR

The present invention relates to an arrangement in circular saws of the kind which incorporate at least one saw-blade fitted to a saw-blade drive spindle or like element. The invention also relates to, a saw-blade assembly for circular saws.

Conventional circular saws, and in particular circular wood-saws, are fitted with at least one thin, circular saw-blade, and normally with a number of such blades. Such saw assemblies also incorporate, to a limited extent, means for guiding the lateral positioning of a blade, for stabilizing the blade and for cooling said blade, such guide means normally being in the form of a mechanical guide plate. Thin blades are used, inter alia, in order to increase yield. The use of thin saw blades, however, is encumbered with a number of drawbacks, such as impaired lateral stability of a saw-blade and its increasing tendency to vibrate as a result of a decrease in the thickness of the blade. These drawbacks normally detract from those advantages afforded by thin saw-blades.

The present invention relates to an arrangement by means of which lateral stability and operational reliability are improved in comparison with what is normal with known arrangements incorporating thin circular saw-blades.

The invention thus provides improved conditions with respect to blade-vibration, i.e. the occurrence of enforced and resonance-based blade-flexures is rendered more difficult. In addition, the tendency of the blade towards so-called buckling instability and the sensitivity of the blade to rigidity-impairing temperature gradients are reduced.

In this regard, the invention enables a wider use of mechanical saw-blade guides, without incurring the risk of undesirable friction between guides and saw-blade. Frictional heat and frictional wear constitute the major reasons for the limited use of mechanical saw-blade guides. The basic cause of these problems is the violent lateral movements executed by a rotating saw-blade, i.e. lateral throw. Lateral throw of a saw-blade may be caused by a number of things inter alia irregularities in the saw-blade, and is relatively small, measuring only some few tenths of a millimetre for example. By expanding the use of correctly designed saw-blade guides, it is possible to eliminate practically all such so-called enforced flexures in a saw-blade. Enforced flexural-waves in parallel with resonance-based flexures are the most common source of errors in measurement and other operational deficiencies when sawing wood with the aid of thin saw-blades.

Consequently, in accordance with one aspect of the invention there is provided an arrangement in circular saws of the kind intended to incorporate at least one saw-blade mounted on a saw-blade drive spindle or like device, and including at least one peripherally arranged guide means which acts against the blade surfaces. The arrangement according to the invention is mainly characterized in that it includes one saw-blade assembly provided with guide means and comprising at least two mutually separate blade-sections, of which a first, peripherally located blade-section having saw-teeth provided thereon is mounted for movement relative to a nearest, inwardly located further blade-section around a boundary zone or interface zone located between said at least two mutually separate blade-sections, and is attached thereto by means of parts which substantially prevent said relative movement between said mutually separate blade-sections, so as to transfer torque from the saw spindle to the peripherally located blade-section.

It should be mentioned here that the expedient of dividing a saw-blade into two or more blade-sections is known, although for reasons other than those encompassed by the present invention and in forms other than those envisaged thereby.

From one aspect, the invention can be said to afford the possibility, highly desirable in many ways, of producing from saw-blades thus divided a saw-blade assembly which, in certain respects, functions as a single-piece saw-blade. From another aspect, the invention can be seen to provide an arrangement which enables novel and wider use of saw-blade guide facilities, thus affording important advantages. The invention can also be seen to reside in a divided saw-blade essentially as defined in the following claim 6, which affords novel and important advantages, and also in a substantially circular saw-blade essentially as defined in the following claim 13.

Figure 2:
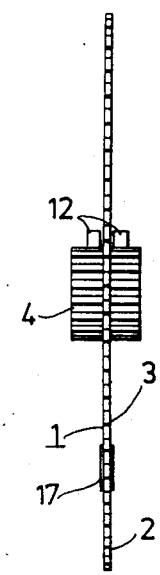
Figure 3:
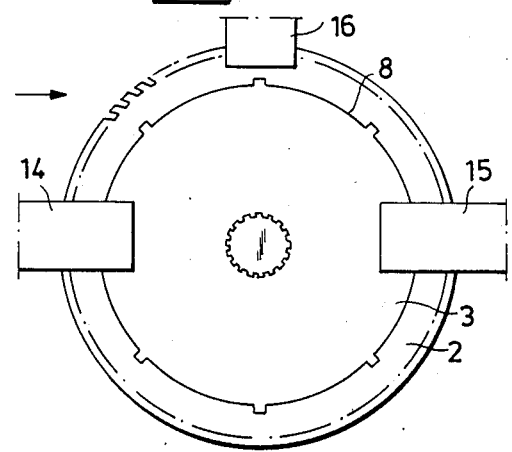

The invention will now be described in more detail with reference to exemplifying embodiments thereof, illustrated in the accompanying drawing, in which FIG. 1 illustrates schematically a first embodiment of an arrangement according to the invention, seen in the axial direction of a circular saw;

FIG. 2 illustrates the arrangement shown in FIG. 1, as seen from the right in said FIG.; and FIG. 3 illustrates a further embodiment of an arrangement according to the invention, seen in the axial direction of a circular saw.

The reference 1 in FIG. 1 identifies a saw-blade assembly according to the invention, which comprises two mutually separate blade-sections 2, 3 which are intended to be mounted on a saw spindle 4 or like element, preferably concentrical therewith, of which blade-sections a peripherally located, outer blade-section 2 is provided with saw-teeth 5 and is non-rigidly connected to the other, radially inwardly located blade-section 3, preferably in a manner such as to be axially movable in relation thereto. The blade-sections 2, 3 are also arranged in a manner to prevent relative rotation therebetween. To this end, the inwardly located blade-section 3 has provided on the periphery thereof spline-like projections 6 which engage in corresponding notches 7 provided in the opposing peripheral surface of the outer blade-section 2, at the interface-zone 8 between the blade-sections 2, 3.

It will be understood that the saw-blade assembly may comprise more than two blade-sections, as shown in FIG. 1 by the interface-zone illustrated by the broken circle 9 and located between an inner blade-section 10 and an intermediate blade-section 11.

Although not shown, it is conceivable within the scope of the invention to provide a saw-blade assembly in which the peripherally located blade-section is separate and free, not firmly connected to an inwardly loacted blade-section or blade-sections, but in which means (not shown) are provided for holding said peripheral blade-section relative to the nearest inwardly located blade-section, such as to limit axial movement in the interface therebetween. In cases such as this, the peripheral blade-section can also be considered to be movably mounted in accordance with the invention.

Thus, the blade-section 3, or the blade-sections 10, 11, located radially inwards of the peripheral blade-section 2 is, or are, arranged to transfer torque from the saw spindle 4 to the peripheral blade-section 2, and to centre the same.

In accordance with one embodiment of the invention, the saw-blade sections 2, 3, or the saw-blade sections 2, 10 and 11, of the saw-blade assembly are produced by dividing-up a saw-blade blank made of substantially one and the same material. In this case, the blank is divided by cutting along lines corresponding to the desired interfaces or boundary lines between respective blade-sections, with the aid of a laser beam for example. Alternatively, the peripheral blade-section 2 can be taken from one given saw-blade blank and the radially inner blade-section, or blade-sections, from a different saw-blade blank.

For the purpose of guiding the various blade-sections incorporated in the saw-blade assembly, there is provided at least one guide means 12 which acts on the assembly with a laterally directed force. In many instances this guide means preferably has the form of a suitable, mechanical saw-blade guide of a kind generally known per se, and has been designated as such. In certain applications, however, it is conceivable that the guide means may have the form of electromagnetic means and/or compressed air means, etc. This guide means is simply referred to hereinafter as the saw-blade guide or the guide, although the interpretation given thereto should not be limited solely to conventional saw-blade guides, but should also include devices which act through a laterally directed force. The saw-blade guide may be a permanent fixture, or may be arranged for movement during a sawing operation.

In accordance with one preferred embodiment of the invention, the blade may be guided at least in the proximity of the intended infeedzone of the blade, this infeed of the blade being indicated by the arrow 13 in FIG. 1. A preferred embodiment of the guide is one in which the guide covers at least one interfacezone between mutually adjacent blade-sections, so as to guide said blade-sections in relation to one another, i.e. substantially in the manner effected by the guide 12 illustrated in FIGS. 1 and 2. This illustrated guide is preferably held stationary during a sawing operation.

FIG. 3 illustrates a more comprehensive guide arrangement. In this arrangement a guide 14, corresponding to the aforesaid guide 12, is located in the proximity of the infeedzone and covers the interface-zone 8 between the peripheral blade-section 2 and the nearest inwardly located blade-section 3. The guide 14 is suitably stationary during a sawing operation. The arrangement also includes at least one further guide 15 arranged in the proximity of the intended outfeedzone and covering the interface-zone 8. The further guide 15 may be stationary or arranged for axial movement during a sawing operation. The reference 16 identifies a third guide intended, for example, for guiding solely the peripherally located blade-section 2. The third guide 16 may be allowed to be held axially during a sawing operation, without risk of overheating or wear.

The manner in which the arrangement according to the invention functions will readily understood in all essentials from the aforegoing. By dividing-up the saw-blade, i.e. by providing a saw-blade assembly comprising mutually separate blade-sections of which a peripherally located, outer blade-section, which is relatively narrow in its radial extension, is arranged axially movable separately from the remaining blade-section or sections, there is obtained a unit which, both statically and dynamically, can be controlled and influenced by mechanical saw-blade guides in a much more favourable manner than can prior art arrangements. For example, the static flexure rigidity of the peripherally located blade-section is much lower, thereby enabling this blade-section to be guided by mechanical contacting guide means, i.e. conventional guides, substantially in the absence of disadvantages arising from friction and wear.

In addition hereto, because the invention permits a more comprehensive use of primarily mechanical saw-blade guide means, the aforesaid problems relating to critical vibration are also solved. The invention also affords increased possibility of reducing the actual play between guide and saw-blade, and also enables the use of geometrically large guide plates, or alternatively a plurality of guide plates on one and the same saw-blade. This eliminates the occurrence of undesirable flexure waves, without the risk of overheating or wear as a result of the forced contact between guide plates and saw-blade. The guides can therewith have the form of precision elements and may be used to advantage with extremely thin saw-blades of large diameter.

Although the above description has been made with reference to one embodiment of the invention, it will be understood that other embodiments are conceivable and that minor modifications can be made without departing from the scope of the invention.

For example, the invention can be applied with both so-called floating saw-blades, i.e. blades which move axially on the saw spindle during a sawing operation, and with fixedly mounted saw-blades and other blade connections.

The radial extension of the blade-sections 2, 3 or 2, 10, 11 may, of course, vary within wide limits. Suitably, the inner peripheral part of the peripherally located blade-section has a radius or the like which is at least about 40% of the radius or the like of the outer peripheral part, even though in many cases the inner periphery suitably has a radius which constitutes a still greater percentage of the radius of the outer periphery.

In addition, the various blade-sections 2, 3 or 2, 10, 11 need not be made of mutually the same material. The various blade-sections may also have mutually different thicknesses. For example, the peripherally located blade-section 2 may be relatively thin while one or more of the radially inwardly located blade-sections may have a greater thickness, or vice versa.

In a number of cases the radially inwardly located blade-sections 3, 10, 11 may be considered as a rotating guide-knife. In other cases, inwardly located blade-sections may be provided with cutting edges, such as edge trimmers 17 in FIG. 1, in substantially the radial direction, or saw-teeth in a substantially conventional manner in the axial direction; inwardly located blade-sections can also be seen as a radial extension of the drive shaft or spindle.

According to one embodiment of the invention in which the saw-blade sections 2, 3 or 2, 10, 11 are produced by dividing a saw-blade blank with the aid of a laser or like means along lines corresponding to desired interface-zones, the cut corrsponding to a given circumferentially extending interface-zone is made obliquely in relation to the intended axial direction, with the inclination alternating inwardly and outwardly in relation to the centre axis. A cut placed in this manner will separate two sections in both the radial and axial directions, although these sections cannot be removed completely from one another due to the axial relative displacement between the sections.

Embodiments are also conceivable, of course, in which recesses formed only in a periphery of the peripherally located blade-section co-act with projecting portions provided on the nearest inwardly located blade-section.

It will be understood that the invention is not restricted to the aforedescribed embodiments and that modifications can be made within the scope of the following claims.

I claim:

1. An arrangement in circular saws of the kind incorporating at least one saw-blade mounted on a saw-blade drive spindle or like element, and at least one saw-blade guide means, characterized in that the arrangement includes a saw-blade assembly (1) which co-operates with guide means (12, 14, 15) and which comprises at least two mutually separate, circumferentially extending blade-sections (2, 3), including one separate, peripherally located blade-section (2) which is provided with saw-teeth (5) and which is arranged for movement relative to the nearest inwardly located blade-section (3, 11) along an interface-zone (8) between the blade-sections (2, 3, 11), and is attached to said nearest inwardly located blade-section by means of parts which substantially prevent relative rotation of the two blade-sections, in order to transfer torque from the saw spindle (4) to the peripheral blade-section (2).

2. An arrangement according to claim 1, characterized in that the arrangement includes at least one saw-blade guide means (12, 14, 15) operative to guide said blade-sections relative to one another in the proximity of a given part of the interface-zone (8) or zones (8, 9) between said blade-sections.

3. An arrangement according to claim 1, characterized in that the arrangment includes at least one saw-blade guide means (12, 14) operative to guide said blade-sections relative to one another in the proximity of the intended infeedzone substantially at the edge of the saw-blade assembly facing the infeed direction.

4. An arrangement according to claim 3, characterized in that the arrangment includes at least one saw-blade guide means (15) operative in guiding said blade-sections relative to one another in the proximity of the intended outfeedzone.

5. An arrangement according to claim 1, characterized in that the arrangement includes at least one saw-blade guide means (16) operative in guiding solely said peripherally located blade-section (2).

6. A circular saw-blade assembly comprising: at least two mutually separate, circumferentially extending blade sections (2,3), including an inwardly located central section adapted to be mounted on a saw spindle or the like, and a peripherally outwardly located, substantially circular section provided with saw-teeth, characterized in that the outwardly located peripheral section (2) is attached for axial movement to the inwardly located section (3,11); and in that said peripherally outwardly located section is attached to said inwardly located section by means of parts which substantially prevent relative rotation of said two sections, such that torque is transmitted from a saw spindle via the inwardly located section to the peripheral section (2).

7. A circular saw-blade according to claim 6, characterized in that the peripheral section (2) is substantially circular in shape and is arranged to co-act with the nearest inwardly located section through the agency of a non-circular interface-zone, such as an interface-zone presenting spline-like parts (6).

8. A circular saw-blade according to claim 6, characterized in that the blade-sections (2, 3, 10, 11) of the saw-blade assembly (1) are taken from a single saw-blade blank.

9. A circular saw-blade according to claim 6, characterized in that the blade-sections (2, 3, 10, 11) of the saw-blade assembly (1) are taken from mutually different saw-blade blanks.

10. A circular saw-blade according to claim 6, characterized in that the peripherally located blade-section (2) is fitted on the inwardly located blade-section (3, 11) and arranged with retained axial mobility.

11. A circular saw-blade according to claim 8, characterized in that the saw-blade sections of the saw-blade assembly (1) are cut from the saw-blade blank with the aid of a laser beam or like device along lines corresponding to the desired interface-zone or zones, the cut corresponding to a given interface-zone extending in the circumferential direction is made inclined relative to the intended axial direction, and the inclination of the cut alternates inwardly and outwardly relative to the centre axis.

12. A circular saw-blade according to claim 6, characterized in that the blade-sections (3, 10, 11) located inwardly of the peripherally located blade-section (2) are provided with cutting edges (17).

13. An annular blade section with inner and outer peripheries, for circular saws in which the outer periphery portion of the blade section is provided with saw-teeth and its inner periphery is adapted to engage a central saw blade section, characterized in that the inner periphery portion of the annular blade-section (2) is provided with circumferentially spaced apart recesses forming deviations from a circular shape of its inner periphery, outwardly projecting parts of the outer periphery of the central section (3, 10, 11) being intended to engage in at least some said recesses during axial movement between the annular blade and the central section, in order to transmit torque, whereby the structural inter-relationship of the outer blade section and the central section permits the outer annular blade section to be fitted onto the central section thereby enabling said annular blade section to be readily changed.

* * * * *